United States Patent [19]

Westerfer et al.

[11] Patent Number: 5,287,409
[45] Date of Patent: Feb. 15, 1994

[54] METHOD AND APPARATUS FOR FRUSTRATING VERTICAL INTERVAL DETECTION IN SCRAMBLED TELEVISION SIGNALS

[75] Inventors: Richard Westerfer, Blue Bell, Pa.; Henry S. Landgraf, Haddon Township, Camden County, N.J.

[73] Assignee: General Instrument Corporation, Hatboro, Pa.

[21] Appl. No.: 15,900

[22] Filed: Feb. 10, 1993

Related U.S. Application Data

[63] Continuation of Ser. No. 714,674, Jun. 13, 1991, abandoned.

[51] Int. Cl.⁵ ............................................. H04N 7/167
[52] U.S. Cl. .......................................... 380/15; 380/20
[58] Field of Search .............................. 380/15, 19, 20

[56] References Cited

U.S. PATENT DOCUMENTS

| | | |
|---|---|---|
| 3,530,232 | 9/1970 | Reiter et al. |
| 3,813,482 | 5/1974 | Blonder |
| 4,095,258 | 6/1978 | Sperber |
| 4,163,252 | 7/1979 | Mistry et al. |
| 4,458,268 | 7/1984 | Ciciora ............................ 380/15 |
| 4,466,017 | 8/1984 | Banker ............................ 380/15 |
| 4,542,407 | 9/1985 | Cooper et al. |
| 4,571,615 | 2/1986 | Robbins et al. |
| 4,621,285 | 11/1986 | Schilling et al. |
| 4,695,908 | 9/1987 | Ryan ............................... 380/15 |
| 4,953,208 | 8/1990 | Ideno |
| 5,125,028 | 6/1992 | Naito .............................. 380/20 |

FOREIGN PATENT DOCUMENTS

2243043 10/1991 United Kingdom.

Primary Examiner—Stephen C. Buczinski
Attorney, Agent, or Firm—Barry R. Lipsitz

[57] ABSTRACT

In order to defeat pirate descramblers that detect the occurrence of a vertical blanking interval from a gap in timing data provided on the sound carrier of a scrambled television signal, diversionary pulse information is inserted into the sound carrier during the vertical blanking interval. A pirate descrambler that looks for a gap in data transmitted on the sound carrier will then detect a "false" second gap, and incorrectly phase lock its horizontal oscillator to random video instead of to horizontal timing information that is recoverable during the vertical blanking interval.

17 Claims, 4 Drawing Sheets

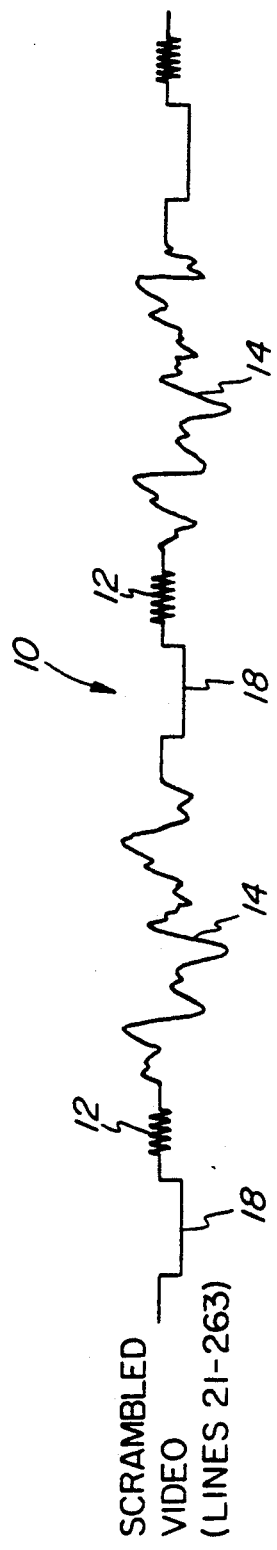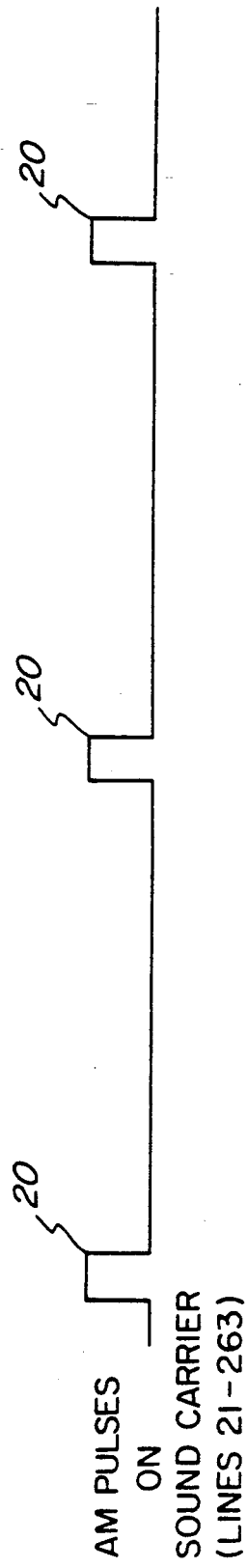

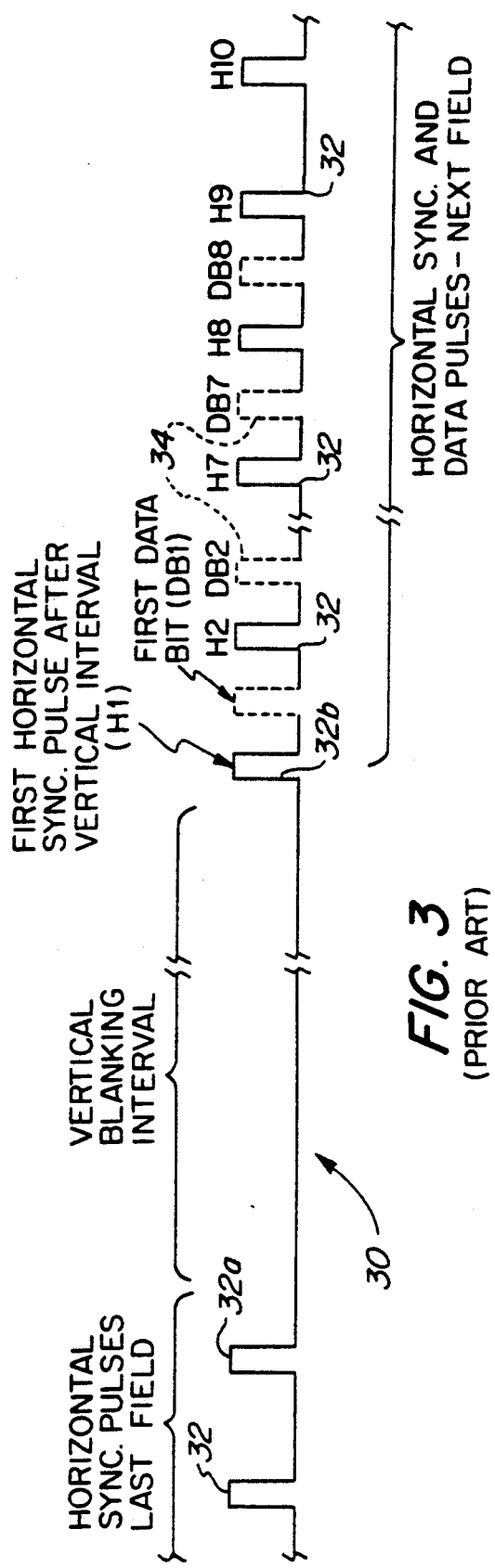
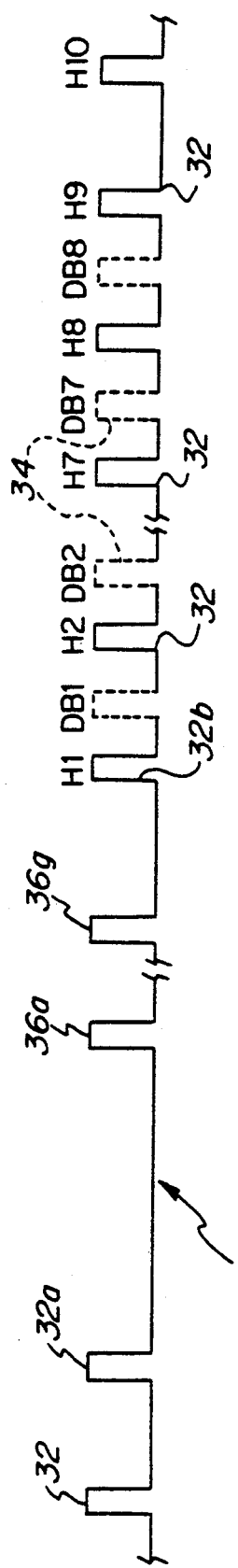
FIG. 3 (PRIOR ART)
FIG. 4

METHOD AND APPARATUS FOR FRUSTRATING VERTICAL INTERVAL DETECTION IN SCRAMBLED TELEVISION SIGNALS

This application is a continuation of commonly assigned, copending U.S. patent application Ser. No. 07/714,674 filed Jun. 13, 1991, now abandoned.

BACKGROUND OF THE INVENTION

The present invention relates to the distribution of scrambled television programs over cable television networks or the like, and more particularly to a method and apparatus for preventing the absence of timing information on the sound carrier of a scrambled television signal from being used to detect the vertical interval for recovering horizontal synchronization information.

Techniques for scrambling the video portions of television signals are well known. For example, U.S. Pat. No. 3,813,482 to Blonder discloses a system for transmitting television signals wherein the video is scrambled by suppressing vertical or horizontal synchronization pulses to produce a shifting or rolling scrambled picture. In U.S. Pat. No. 4,542,407 to Cooper, et al, apparatus is disclosed for scrambling and descrambling television programs in which the horizontal synchronizing information is suppressed at a cable television headend, and then regenerated by a subscriber's cable television converter. U.S. Pat. Nos. 4,095,258 to Sperber, 4,163,252 to Mistry, et al, and 4,571,615 to Robbins, et al describe apparatus for decoding scrambled television signals.

The economic viability of subscription television programming, including cable television and satellite television services, is dependent on the ability of the transmitter to encode or scramble a television signal so that an unauthorized receiver will not be able to receive a viewable television picture. As indicated in the patents cited above, a common technique that has been employed to scramble video signals is to suppress the horizontal synchronization pulses below the average value of the video level. This causes the television receiver to unsuccessfully attempt to lock horizontally on random video peaks rather than on the horizontal synchronization pulses. The loss of effective horizontal synchronization also prevents the receiver from properly utilizing the color burst signal associated with the horizontal synchronization pulse, so that accurate color reproduction cannot be achieved.

In order for a receiver to be able to view the scrambled video signal, the suppressed synchronization pulses must be restored. Two techniques are commonly employed to allow the receiver to recover the suppressed sync and timing information. In one technique, a timing pulse is amplitude modulated on the FM audio carrier of the television signal, which is then detected in the audio portion of the receiver and used to generate the timing signals necessary to descramble the received video signal. This technique is the subject of U.S. Pat. No. 4,621,285 issued on Nov. 4, 1986 to Schilling et al and entitled "Protected Television Signal Distribution System", the entire disclosure of which is incorporated herein by reference.

In another known technique, some portion of the sync timing pulses, such as during the vertical blanking interval, is transmitted without suppression, i.e., "in the clear". The receiver phase locks to the clear or unsuppressed sync portion to create the required synchronizing and timing information for descrambling the video portions of the signal.

Neither of these known techniques are immune to unauthorized recovery by "pirate" descramblers. Such descramblers are known that will restore usable synchronization to virtually all known prior art sync suppressed video signals. One such device that can overcome the scrambling technique disclosed in the aforementioned Schilling et al patent relies on the absence of horizontal synchronizing pulse timing information on the sound carrier during the vertical blanking interval portion of the scrambled television signal. The absence of such information is detected, indicating the occurrence of the vertical blanking interval. The pirate descrambler uses this information to locate synchronization pulses on the video carrier during the vertical blanking interval. Such pulses can be detected because there is no video information to mask them during vertical blanking. The detected synchronization pulses are then used to phase lock an oscillator that provides synchronization pulses during the active video portions of the signal.

It would be advantageous to provide a system for scrambling the video portion of television signals that would preclude the detection of the vertical blanking interval from the absence of horizontal synchronizing timing pulses on the sound carrier. Such a system would defeat the ability of pirate descramblers to recover synchronization information during the vertical blanking interval. It would be further advantageous to provide such a system that will not interfere with the descrambling of scrambled signals by the millions of authorized descramblers already installed in the field. The present invention provides such a system.

SUMMARY OF THE INVENTION

In accordance with the present invention, a method is provided for enhancing the scrambling security of a television signal that is scrambled by suppressing synchronization information during a video portion thereof and is provided with synchronization recovery timing data in an audio portion thereof. At least one data pulse is inserted in the audio portion during a vertical blanking interval of the scrambled television signal. This prevents the occurrence of the vertical blanking interval from being accurately detected in the audio portion for use in recovering synchronization data present in the video portion during said occurrence. The data pulses are advantageously inserted in locations of the audio portion corresponding to lines 11 to 17 of a field of the video portion. In a preferred embodiment, the inserted data pulses appear to be conventional synchronization recovery timing data pulses that are inserted in locations of the audio portion corresponding to each of lines 11 to 17 during the vertical blanking interval.

Apparatus in accordance with the present invention enhances the scrambling security of a sync suppressed scrambled television signal. Means are provided for inserting a data pulse in the audio portion of the scrambled television signal, during a vertical blanking interval thereof. This prevents the use of the audio portion to accurately detect the vertical blanking interval for use in recovering synchronization data in the vertical blanking interval of the television signal video portion. In an illustrated embodiment, the pulse inserting means insert data pulses in locations of the audio portion corresponding to each of lines 11 to 17 of a field of the video portion. The data pulses appear to be conventional horizontal synchronization recovery timing pulses.

A video distribution apparatus is provided having signal originating means including means for transmitting a picture carrier selectively modulated in amplitude to reduce the level of vertical and horizontal synchronization information relative to video picture information. Means are provided for transmitting a sound carrier modulated in amplitude with horizontal synchronizing pulse timing information except during the vertical blanking interval. This enables a receiver to recover vertical synchronizing timing information from the absence of the horizontal synchronizing pulse timing information on the sound carrier during a first portion of the vertical blanking interval. In accordance with the present invention, means are provided for inserting diversionary pulse information into the sound carrier during a second portion of the vertical blanking interval. This precludes the absence of the horizontal synchronizing pulse timing information on the sound carrier during vertical interval from being used to establish a reference for the recovery of horizontal synchronizing timing from the video camera. In an illustrated embodiment, the second portion of the vertical synchronizing interval corresponds to horizontal lines 11 to 17 of a television field.

BRIEF DESCRIPTION OF THE DRAWINGS

FIG. 1 illustrates a scrambled video waveform having consecutive lines of television information;

FIG. 2 illustrates a waveform containing timing pulses on the sound carrier of a television signal;

FIG. 3 illustrates a prior art sound carrier waveform having pulse amplitude modulated horizontal sync and data pulses;

FIG. 4 illustrates a television sound carrier waveform pulse amplitude modulated in accordance with the present invention to include data pulses during the vertical blanking interval;

DETAILED DESCRIPTION OF THE INVENTION

Figure 5:
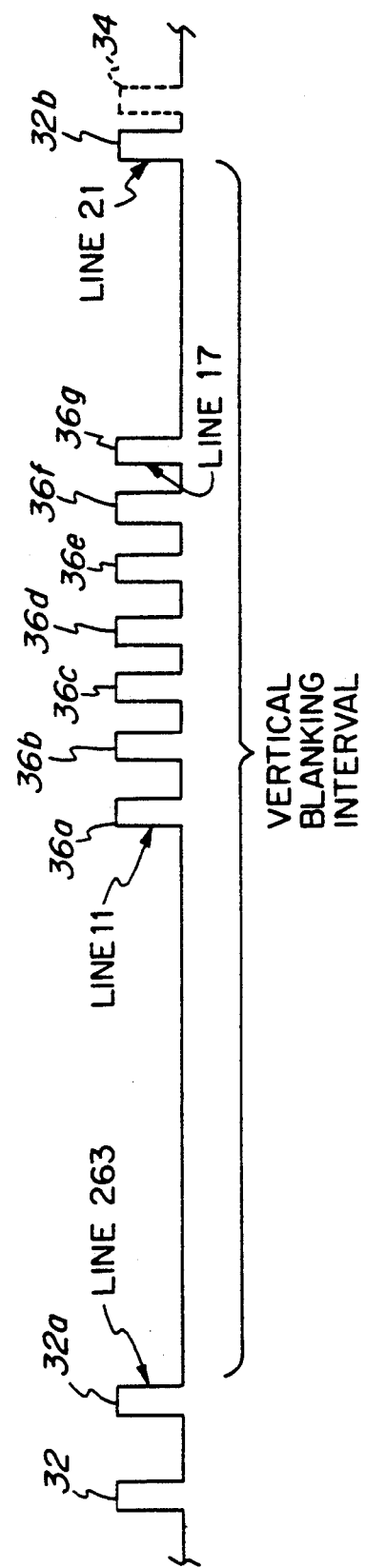
FIG. 5 is a more detailed representation of the vertical blanking interval portion of FIG. 4.

In conventional sync suppression scrambling systems for NTSC (National Television Systems Committee) color television signals, horizontal synchronization pulses are often pulse amplitude modulated onto the sound carrier of the scrambled television signal. In order to derive a vertical synchronization signal, the horizontal sync pulses are not added to the sound carrier during the vertical blanking interval portions of the television signal. Thus, vertical detector means provided in a descrambler can recover vertical synchronizing timing from the absence of the horizontal synchronizing pulse timing information on the sound carrier during the vertical blanking interval. Illegal decoder boxes utilize this fact to detect the vertical blanking interval from the television sound carrier. These boxes then phase lock to horizontal synchronization pulses contained in the video carrier during the vertical blanking interval in order to obtain the horizontal synchronization information necessary to descramble the video portion of the television signal.

The present invention adds data pulses to the sound carrier during the vertical blanking interval in order to frustrate attempts to accurately detect a vertical blanking interval for purposes of descrambling the television signal.

FIG. 1 illustrates a video waveform, generally designated 10, of a conventional NTSC television signal that has been scrambled by suppressing the horizontal blanking interval including horizontal sync pulse 18 and color burst 12 with respect to the video information portions 14 of the signal. The waveform illustrated in FIG. 1 is indicative of the active video portions of the scrambled television signal, i.e., lines 21 up to 263 of each field.

FIG. 2 illustrates the provision of horizontal timing pulses 20 on the sound carrier of the scrambled television signal. Each pulse 20 corresponds in time to a suppressed horizontal synchronization pulse 18 on the video carrier. In prior art systems, the timing pulses 20 were provided only during the active video portions of the television signal (i.e., lines 21 up to 263) and not during the vertical blanking interval. This is shown in FIG. 3, which illustrates in greater detail the modulation of a sound carrier generally designated 30. Horizontal synchronization pulses 32 are provided on the sound carrier for use in descrambling the scrambled video signal having suppressed synchronization pulses. The last horizontal synchronization pulse on the sound carrier for a given field is designated 32a. Then, the vertical blanking interval of the next field arrives, and no horizontal synchronization pulses are provided during this time. The first horizontal synchronization pulse after the vertical interval for the new field is shown at 32b. In accordance with well known techniques, as described in U.S. Pat. No. 4,621,285 referred to above, eight bits of data DB1 through DB8 are interlaced with the first eight horizontal synchronization pulses after the vertical blanking interval in each field. These data pulses 34 identify, for example, the class of viewers authorized to receive the program.

In accordance with the present invention, as illustrated in FIG. 4, additional data pulses are inserted in the audio portion of the scrambled television signal during the vertical blanking interval. Such pulses, 36a through 36g, are advantageously provided on each of lines 11 to 17 during the vertical blanking interval. This is illustrated in greater detail in FIG. 5. Each of the pulses 36a-36g added during the vertical blanking interval is the same magnitude and duration as a conventional synchronization recovery timing data pulse 32. As indicated in FIG. 5, the vertical blanking interval extends from the first line in a new field through line 20 of the new field. Active video lines commence at line 21, in accordance with the standard NTSC format. Those skilled in the art will appreciate that the specific format illustrated herein corresponds to NTSC television signals, although the invention is equally applicable to other television formats, such as PAL and SECAM.

The addition of pulses 36a to 36g during the vertical blanking interval causes a pirate descrambler attempting to locate the vertical blanking interval to falsely detect a second vertical blanking interval commencing at lines 18 to 21 of each field. This causes the detected "false" vertical blanking interval to run into the active video portions of the television signal starting at line 21 of each field. Thus, the sync stripper in the pirate descrambler that is intended to locate legitimate horizontal synchronization pulses from the video carrier during the vertical blanking interval will trigger on active video portions of the signal rather than on legitimate synchronization pulses. As a result, the pirate descrambler will attempt to lock to video, which acts like a random signal. The oscillator in the pirate descrambler will not be properly locked to horizontal sync when it begins to free run, and the television signal will not be properly descrambled.

Figure 6:
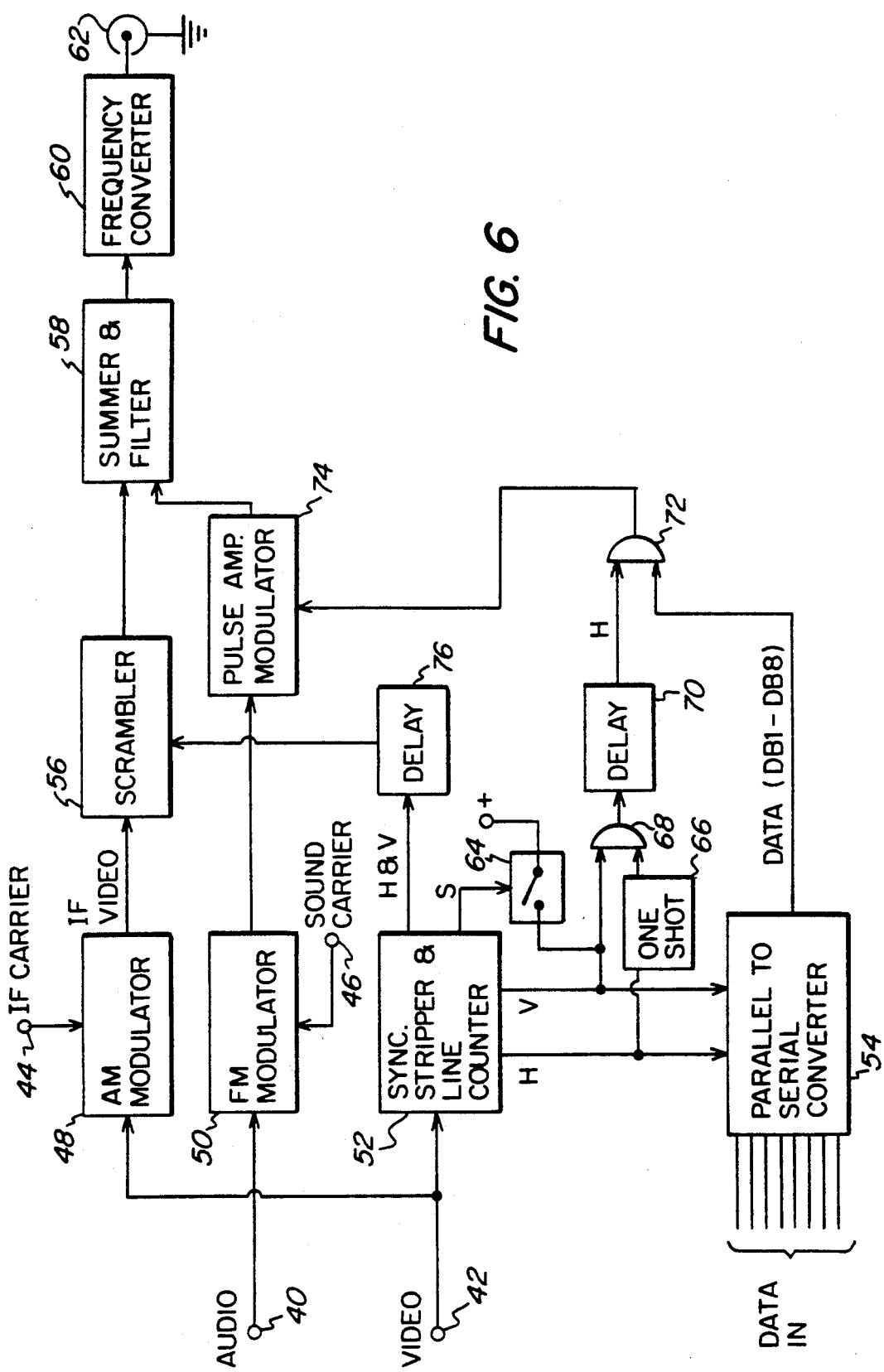
FIG. 6 is a block diagram illustrating scrambling apparatus in accordance with the present invention.

Scrambling apparatus in accordance with the present invention is illustrated in FIG. 6. Composite baseband video, complete with its synchronizing information, is supplied to a picture carrier AM modulator 48 via input terminal 42. The output of modulator 48, which receives an intermediate frequency carrier at terminal 44, is the video intelligence and synchronizing information in a proper format, at the desired intermediate frequency.

The composite baseband video is also supplied via terminal 42 to a sync stripper and line counter 52 which supplies on respective outputs thereof horizontal pulse timing information ("H"), vertical period timing ("V"), a pulse train containing both horizontal and vertical information ("H" & "V"), and a switching signal ("S"). Sync stripper circuits and line counters are well known to those skilled in the art, and may be assembled from standard components, which can include clamp circuits followed by level detectors and digital counters, all as per se well known.

The horizontal and vertical combined pulse train H & V is delayed by a delay circuit 76 to compensate for delays in the AM modulator 48. The output of delay 76 gates a scrambler 56, that can comprise a variable attenuator or a variable gain amplifier. Scrambler 56 reduces the amplitude of the AM modulated picture carrier output from modulator 48, e.g., by 6 dB, whenever a horizontal pulse H or vertical period signal V occurs. Thus, the synchronizing pulse peak amplitudes become indistinct with respect to the picture intelligence signal, so that the modulated picture carrier at the output of scrambler 56 cannot be recovered and viewed by standard television receivers that cannot locate and respond to either the suppressed horizontal or vertical synchronization pulses.

The audio portion of the television signal is input to a terminal 40, and FM modulated by a modulator 50 on a sound carrier input at terminal 46. The modulated sound carrier is passed to a pulse amplitude modulator 74 that is used to modulate horizontal synchronization timing information H and tag data DB1 to DB8 from AND gate 72 onto the sound carrier. The sound carrier including the horizontal synchronization pulses H and data DB1 to DB8 output from modulator 74 is summed with the scrambled video information in a conventional summer and filter circuit 58. The resultant composite scrambled signal is input to a frequency converter 60 for distribution over a cable television network or the like coupled to terminal 62 at an appropriate transmission frequency.

The tag data DB1 to DB8 is provided by a conventional parallel-to-serial converter circuit 54 that receives the data in a parallel format from an addressable controller as well known in the art. The horizontal synchronization timing pulses H are provided to AND gate 72 from sync stripper and line counter 52, after processing in accordance with the present invention. In particular, the horizontal synchronization timing pulses are input to a one shot timing circuit 66 that outputs a single pulse of a desired duration each time the sync stripper detects a horizontal synchronization pulse in the video waveform input to terminal 42. The pulses produced by one shot 66 are input to an AND gate 68, that also receives the vertical period timing V detected by sync stripper 52. A switch 64 is actuated by a signal S produced by the line counter portion of sync stripper and line counter 52. The vertical period timing V is high during each field, except during the vertical blanking interval when the V signal is low. Signal S actuates switch 64 to apply a high signal to AND gate 68 during lines 11 to 17 of the vertical blanking interval. This causes AND gate 68 to pass the horizontal synchronization timing pulses from one shot 66 for each of lines 11 to 17, resulting in the insertion of these pulses during the vertical blanking interval as illustrated in FIG. 5. A delay 70 is provided to compensate for modulation delays at the transmitter and also to equalize for the delays present in the descrambler electronics that ultimately receive the data.

It should now be appreciated that the present invention provides a system for overcoming pirate descramblers that detect the vertical blanking interval from a gap in the AM data stream carried on the sound carrier of a scrambled television signal. Once the pirate descrambler detects such a gap, the demodulated video output is sampled by a sync stripper during the vertical interval, in order to recover horizontal synchronization pulses to phase lock an oscillator at the horizontal rate. The phase locked oscillator is then used to restore horizontal synchronization. Such pirate descramblers are defeated in accordance with the present invention by inserting diversionary pulses into the sound carrier during the vertical blanking interval, causing the pirate descrambler to incorrectly detect the vertical blanking interval and phase lock to random video information instead of to the horizontal timing information.

Although the invention has been described in connection with a specific embodiment, those skilled in the art will appreciate that numerous adaptations and modifications may be made thereto without departing from the spirit and scope of the invention as set forth in the claims.

What is claimed is:

1. A method for enhancing the scrambling security of a television signal that is scrambled by suppressing synchronization information during a video portion thereof and is provided with synchronization recovery timing data in an audio portion thereof, said timing data having a VBI gap therein during a vertical blanking interval of said television signal, comprising the steps of:

identifying the vertical blanking interval in said scrambled television signal; and in response to said identifying step, inserting diversionary pulse information in the VBI gap of said timing data carried by said audio portion, said diversionary pulse information establishing first and second subgaps within said VBI gap, said first subgap ending at the commencement of said diversionary pulse information and said second subgap beginning immediately after said diversionary pulse information;

wherein said second subgap has a width sufficient to enable it to be falsely detected as the commencement of a new VBI gap, thereby preventing the occurrence of said vertical blanking interval from being accurately detected in said audio portion for use in recovering synchronization data present in said video portion during said occurrence.

2. A method in accordance with claim 1 wherein said diversionary pulse information comprises a plurality of data pulses that are inserted in locations of said audio portion corresponding to lines 11 to 17 of a field of said video portion.

3. A method in accordance with claim 2 wherein said data pulses appear to be conventional synchronization recovery timing data pulses and are inserted in locations of said audio portion corresponding to each of lines 11 to 17 during said vertical blanking interval.

4. A method in accordance with claim 1 wherein additional diversionary pulse information is inserted in said VBI gap to establish additional subgaps within said VBI gap.

5. A method in accordance with claim 1 wherein said second subgap is provided at the end of said VBI gap.

6. A method in accordance with claim 1 wherein said second subgap occurs over a period of at least one and one-half horizontal lines of said television signal.

7. Apparatus for enhancing the scrambling security of a television signal that is scrambled by suppressing synchronization information during a video portion thereof and is provided with synchronization recovery timing data in an audio portion thereof, said timing data having a VBI gap therein during a vertical blanking interval of said television signal, comprising:
  means for identifying the vertical blanking interval of said scrambled television signal; and
  means responsive to said identifying means for inserting diversionary pulse information in the VBI gap of said timing data carried by said audio portion during said vertical blanking interval of said scrambled television signal, said diversionary pulse information establishing first and second subgaps within said VBI gap, said first subgap ending at the commencement of said diversionary pulse information and said second subgap beginning immediately after said diversionary pulse information;
  wherein said second subgap has a width sufficient to enable it to be falsely detected at a receiver as the commencement of a new VBI gap, thereby preventing the use of said audio portion to accurately detect said vertical blanking interval for use in recovering synchronization data in the vertical blanking interval of said video portion.

8. Apparatus in accordance with claim 7 wherein said diversionary pulse information inserting means insert a plurality of data pulses in locations of said audio portion corresponding to lines 11 to 17 of a field of said video portion.

9. Apparatus in accordance with claim 4 wherein said data pulses appear to be conventional synchronization recovery timing data pulses and are inserted in locations of said audio portion corresponding to each of lines 11 to 17 during said vertical blanking interval.

10. Apparatus in accordance with claim 7 wherein additional diversionary pulse information is inserted in said VBI gap to establish additional subgaps within said VBI gap.

11. Apparatus in accordance with claim 7 wherein said second subgap is provided at the end of said VBI gap.

12. Apparatus in accordance with claim 7 wherein said second subgap occurs over a period of at least one and one-half horizontal lines of said television signal.

13. In a video distribution apparatus having:
  signal originating means including means for transmitting a video carrier selectively modulated in amplitude to reduce the level of vertical and horizontal synchronization information relative to video picture information; and
  means for transmitting a sound carrier modulated in amplitude with horizontal synchronizing pulse timing information except during a vertical blanking interval, whereby a receiver can recover vertical synchronizing timing from a VBI gap caused by the absence of said horizontal synchronizing pulse timing information on said sound carrier during said vertical blanking interval;
  the improvement comprising:
  means for identifying said vertical blanking interval; and
  means responsive to said identifying means for inserting diversionary pulse information into said sound carrier during said VBI gap, said diversionary pulse information establishing first and second subgaps within said VBI gap, said first subgap ending at the commencement of said diversionary pulse information and said second subgap beginning immediately after said diversionary pulse information;
  wherein said second subgap has a width sufficient to enable it to be falsely detected at said receiver as the commencement of a new VBI gap, thereby preventing said VBI gap from being used to accurately recover horizontal synchronizing timing from said video carrier.

14. Apparatus in accordance with claim 13 wherein said diversionary pulse information is inserted into a portion of said sound carrier corresponding to horizontal lines 11 to 17 of a television field.

15. Apparatus in accordance with claim 13 wherein additional diversionary pulse information is inserted in said VBI gap to establish additional subgaps within said VBI gap.

16. Apparatus in accordance with claim 13 wherein said second subgap is provided at the end of said VBI gap.

17. Apparatus in accordance with claim 13 wherein said second subgap occurs over a period of at least one and one-half horizontal lines of said television signal.

* * * * *